US012619051B2

(12) United States Patent
Kim et al.

(10) Patent No.: US 12,619,051 B2
(45) Date of Patent: May 5, 2026

(54) ZOOM DRIVE ACTUATOR

(71) Applicant: JAHWA electronics Co., Ltd., Cheongju-si (KR)

(72) Inventors: Hee Seung Kim, Seoul (KR); Kyu Min Lee, Bucheon-si (KR)

(73) Assignee: JAHWA electronics Co., Ltd., Cheongju-si (KR)

( * ) Notice: Subject to any disclaimer, the term of this patent is extended or adjusted under 35 U.S.C. 154(b) by 358 days.

(21) Appl. No.: 18/248,929

(22) PCT Filed: Sep. 9, 2021

(86) PCT No.: PCT/KR2021/012258
§ 371 (c)(1),
(2) Date: Apr. 13, 2023

(87) PCT Pub. No.: WO2022/102934
PCT Pub. Date: May 19, 2022

(65) Prior Publication Data
US 2023/0341745 A1     Oct. 26, 2023

(30) Foreign Application Priority Data
Nov. 12, 2020     (KR) ......................... 10-2020-0150675

(51) Int. Cl.
*G02B 7/10*          (2021.01)
*G02B 27/64*        (2006.01)
*G03B 5/04*          (2021.01)

(52) U.S. Cl.
CPC .............. *G02B 7/102* (2013.01); *G03B 5/04* (2013.01); *G02B 27/646* (2013.01); *G03B 2205/0046* (2013.01); *G03B 2205/0069* (2013.01)

(58) Field of Classification Search
CPC .......... G02B 7/02; G02B 7/021; G02B 7/023; G02B 7/04; G02B 7/08; G02B 7/09;
(Continued)

(56) References Cited

U.S. PATENT DOCUMENTS

2018/0364450 A1* 12/2018 Lee ......................... G02B 7/003
2018/0367714 A1* 12/2018 Im ......................... H04N 23/687
(Continued)

FOREIGN PATENT DOCUMENTS

KR     10-2018-0135392 A     12/2018
KR     10-2018-0137278 A     12/2018
(Continued)

*Primary Examiner* — Nicholas R. Pasko
(74) *Attorney, Agent, or Firm* — ZION IP; Byungwoong Park

(57) ABSTRACT

Provided herein is a zoom drive actuator comprising a first carrier movable along an optical axis, a second carrier capable of moving anterior or posterior to the first carrier along the optical axis, a housing enclosing the first and second carriers, a first coil unit; and a second coil unit, in which the first carrier comprises a first mount equipped with a first lens assembly, a first support to which a first magnet is attached, and a first guide placed on the side of the first mount opposite to the first support, in which the second carrier comprises a second mount equipped with a second lens assembly, a second support to which a second magnet is attached, and a second guide placed on the side of the second mount opposite to the second support and in which the first coil unit faces the first magnet and the second coil unit faces the second magnet and where the first carrier comprises a first space forming a corridor to allow the second guide to make a passage through it and the second carrier comprises a second space forming a corridor to allow the first guide to make a passage through it.

7 Claims, 8 Drawing Sheets

(58) Field of Classification Search
CPC ........ G02B 7/10; G02B 7/102; G02B 27/646;
G03B 5/04; G03B 2205/0046; G03B
2205/0069; H04N 23/51; H04N 23/54;
H04N 23/55; H04N 23/57; H04N 23/687;
H04N 23/6812; H04N 23/68; H04N
23/685; H04N 23/67; H04N 23/672
See application file for complete search history.

(56)                  References Cited

U.S. PATENT DOCUMENTS

| | | | | |
|---|---|---|---|---|
| 2020/0137274 | A1* | 4/2020 | Lee | G03B 17/17 |
| 2020/0348479 | A1* | 11/2020 | Kwon | G02B 7/021 |
| 2020/0351421 | A1* | 11/2020 | Park | H04N 23/54 |
| 2020/0409015 | A1* | 12/2020 | Kim | G03B 3/10 |
| 2021/0018719 | A1* | 1/2021 | Park | G03B 13/36 |
| 2021/0067667 | A1* | 3/2021 | Yang | G02B 27/646 |
| 2021/0215905 | A1* | 7/2021 | Kim | G02B 7/28 |
| 2021/0231904 | A1* | 7/2021 | Son | G03B 30/00 |
| 2022/0276462 | A1* | 9/2022 | Jang | G03B 13/36 |
| 2022/0279125 | A1* | 9/2022 | Jang | G02B 27/646 |
| 2022/0317412 | A1* | 10/2022 | Kim | G02B 7/105 |
| 2022/0413356 | A1* | 12/2022 | Jang | G03B 30/00 |
| 2023/0273392 | A1* | 8/2023 | Osaka | H02N 2/02 |
| | | | | 359/819 |

FOREIGN PATENT DOCUMENTS

| | | | |
|---|---|---|---|
| KR | 10-2020-0060201 | A | 5/2020 |
| KR | 10-2020-0125221 | A | 11/2020 |
| KR | 10-2020-0126873 | A | 11/2020 |
| WO | 2020-141466 | A1 | 7/2020 |

* cited by examiner

ZOOM DRIVE ACTUATOR

TECHNICAL FIELD

The present disclosure relates to a zoom drive actuator. More particularly, the present disclosure relates to a zoom drive actuator capable of reliably enhancing driving performance over extended strokes.

BACKGROUND ART

As the hardware technology for image processing has been developed and the user needs for image shooting have increased, functions such as autofocus (AF) and optical image stabilization (OIS) have been applied to a camera module or the like, mounted to a portable terminal such as a cellular phone and a smart phone as well as an independent camera device.

Recent years have seen actuators for zoom lens that supports variable adjustment features including the object size by tuning the focal length through such functions as zoom-in and zoom-out. In certain models of actuators, further diversification in implementing zoom has been attainable through combinations in the relative positions among multiple lenses (lens assemblies).

Since zoom lenses have longer or extended distances of movement along the optical axis (also referred to as stroke) than ordinary lenses, the actuators used for driving zoom lens should be designed to exert correspondingly strong driving force.

Actuator design known in the art, however, simply resorted to repetitions of the physical substructure responsible for driving carriers for the purpose of securing independent movement for each of the multiple carriers.

This approach accordingly led to inflated actuator dimensions and this complicated the use of prior art actuators in applications such as smart phones where size or volume was a significant issue.

DISCLOSURE

Technical Problem

The present disclosure has been contemplated to solve the aforementioned problems of the related art in the context mentioned above. It is a technical goal herein to provide a more stably maintained driving of each carrier. Furthermore, it is another technical goal herein to achieve a more effective utilization of space within the actuator.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

To achieve the technical goals mentioned above, in one aspect of the present disclosure is provided a zoom drive actuator comprising a first carrier movable along an optical axis, a second carrier capable of moving anterior or posterior to the first carrier along the optical axis, a housing enclosing the first and second carriers, a first coil unit; and a second coil unit, in which the first carrier comprises a first mount equipped with a first lens assembly, a first support to which a first magnet is attached, and a first guide placed on the side of the first mount opposite to the first support, in which the second carrier comprises a second mount equipped with a second lens assembly, a second support to which a second magnet is attached, and a second guide placed on the side of the second mount opposite to the second support and in which the first coil unit faces the first magnet and the second coil unit faces the second magnet. Here the first carrier can be configured to comprise a first space forming a corridor to allow the second guide to make a passage through it and the second carrier can be configured to comprise a second space forming a corridor to allow the first guide to make a passage through it.

In a particular embodiment, the first support may comprise a first rail facing a first guide rail formed on the housing, with the first rail extending further along the optical axis than the first mount. The first guide may comprise a second rail facing a second guide rail formed on the housing, in which case the zoom drive actuator may further comprise a plurality of balls; with at least one of said plurality of balls positioned between the first rail and the first guide rail and at least one of said plurality of balls positioned between the second rail and the second guide rail.

In addition, the second support may comprise a third rail facing a third guide rail formed on the housing in which the third rail has a shape extending further along the optical axis than the second mount in a direction opposite to the first support. The second guide may comprise a fourth rail facing a fourth guide rail formed on the housing, in which case the zoom drive actuator further comprises a plurality of balls; with at least one of said plurality of balls positioned between the third rail and the third guide rail and at least one of said plurality of balls positioned between the fourth rail and the fourth guide rail.

In a preferable embodiment, the first space is formed between the first mount and the first support and the second space is formed between the second mount and the second support.

Moreover, the zoom actuator may further comprise a yoke equipped to the housing, with said yoke generating an attractive force towards the first magnet as well as a first balancing magnet attached to the first guide, with said first balancing magnet generating an attractive force towards the yoke.

According to certain embodiments, the zoom actuator may further comprise a yoke equipped to the housing, with said yoke generating an attractive force towards the second magnet as well as a second balancing magnet attached to the second guide, with said second balancing magnet generating an attractive force towards the yoke.

Advantageous Effects

According to an embodiment of the present disclosure, a physical arrangement of plural carriers in symmetrically opposing directions affords sufficient scope for independent movement for each lens (lens assembly) attached to each carrier.

According to a preferred embodiment of the present disclosure, an improved physical arrangement in which a part of each carrier has been made to cross over or overlap upon one another affords not only guaranteed independent movement for each of the plurality of carriers, but also a device implementation in which the entire structure and shape are compact, making it optimal for overall space minimization and slimming of the mobile terminal based thereon.

According to a preferred embodiment of the present disclosure, equipping each carrier with a magnet of sufficient size is attainable by providing the magnet attachment space in which the carriers are asymmetrically arranged with one another with reference to the lens attachment area. This provides a more effective means for strengthening the driving force of each carrier.

DESCRIPTION OF DRAWINGS

The accompanying drawings illustrate a preferred embodiment of the present disclosure and together with the foregoing disclosure, serve to further the understanding of the technical ideas of the present disclosure. Accordingly, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
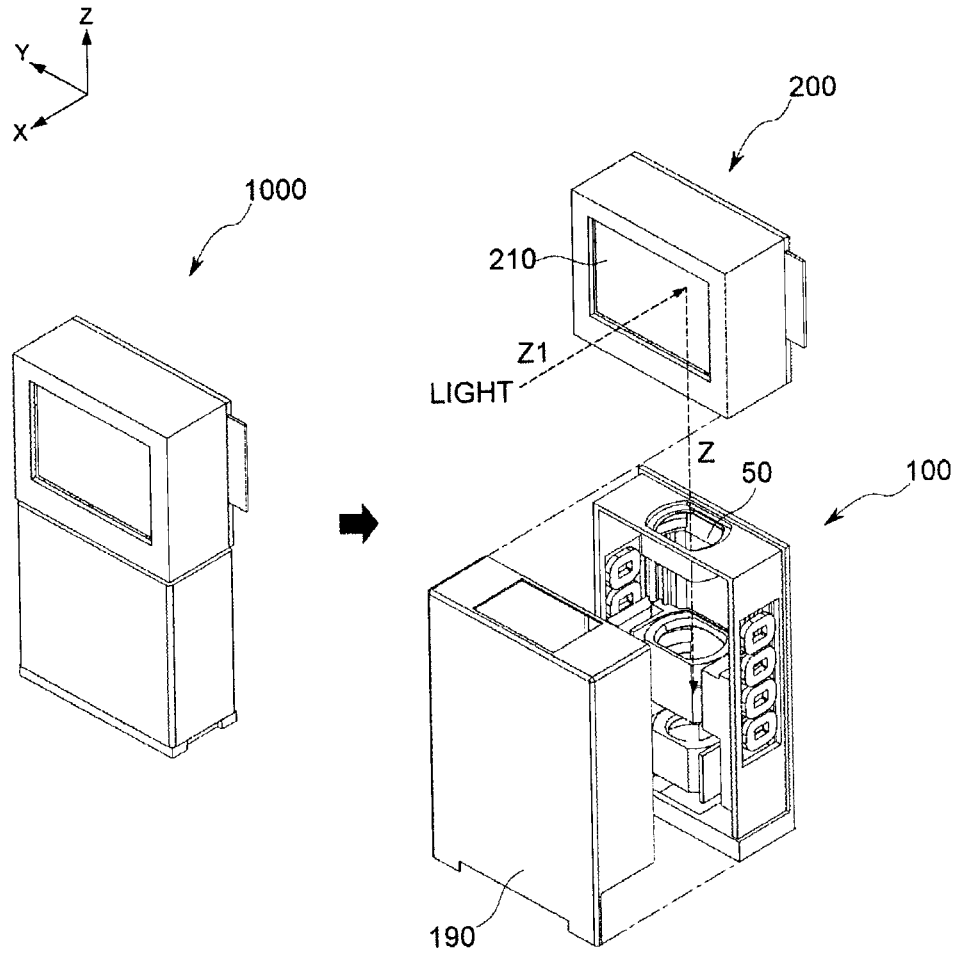
FIG. 1 illustrates the overall configuration of a zoom drive actuator and a camera module in accordance with a preferred embodiment of the present invention.

FIG. 1 depicts the overall configuration of a zoom drive actuator (hereinafter referred to simply as "actuator") (100) and a camera module (1000) in accordance with a preferred embodiment of the present invention.

The actuator (100) of the present invention can be embodied along with such other parts as a reflectometer module (200) as part of a camera module (1000) as illustrated in FIG. 1, not to mention as a single stand-alone device.

As will be described in detail below, the actuator (100) of the present invention is for carrying out autofocusing or zooming by driving in a linear motion along the optical axis each of a plurality of carriers to which a lens (lens assembly) is attached.

The reflectometer module (200), which can be set up upstream or anterior to (along the optical axis) the actuator (100), reflects or refracts the optical path (Z1) of the object towards a path in the direction of the lens (Z). The light thus reflected or refracted towards the optical axis passes the lens (lens assembly) mounted on the carrier and enters the image sensor such as complementary metal oxide semiconductor (CMOS) and charge coupled device (CCD).

The reflectometer module (200) for modifying the optical path may comprise a reflectometer (210) that consists of one selected from a mirror, a prism or a combination of both. The reflectometer (210) can be constructed from a variety of material capable of modifying the path of the incoming light from the outside toward the optical axis, but for the purpose of high performance optical properties, glass is the preferred medium.

The camera module (1000) of the present invention comprising such elements as the reflectometer module (200) is configured to refract the path of light toward the lens. This allows the entire device to be set up lengthwise along the mobile terminal instead of across the width so as to help keep the mobile terminal thin, which is optimal for miniaturization and slimming of mobile terminals.

In certain embodiments, the reflectometer (210) is configured to move in rotational motion by the action of driving means capable of generating magnetic field such as magnets and coils. Thus, as the reflectometer (210) moves or moves in rotational motion, the light from the object reflected (refracted) by the reflectometer (210) is led along the ±Y-axis and/or ±X-axis to enter the lens and image pick-up element, thereby enabling corrections to camera shake along the X-axis and/or Y-axis.

The light from the object thus reflected by the reflectometer module (200) enters into the first lens assembly (60) and second lens assembly (70) equipped within the actuator (100), and functions such as zooming and autofocusing are carried out by making combinatorial adjustments to the positions (along the optical axis) for each of the first (60) and second (70) lens assemblies.

In certain embodiments, a fixed lens assembly (50) can be set up anterior to the actuator (100) (along the optical axis) as illustrated in FIG. 1 to enhance optical performances such as actuator (100) zoom ratio.

As described hereinafter, the optical axis (Z-axis) is defined as the axis corresponding to the path of the incoming light, e.g., toward the first lens assembly (60) and the two axes spanning a plane perpendicular to the optical axis (Z-axis) are defined as the X-axis and Y-axis.

Each of the fixed lens assembly (50), first lens assembly (60) and second lens assembly (70) may comprise at least one lens or an optical unit and a housing. The accompanying drawings, however, illustrate a fixed lens assembly (50), a first lens assembly (60) and a second lens assembly (70) having no attached lens or the like for the purpose of clarity in terms of the internal configuration.

Figure 2:
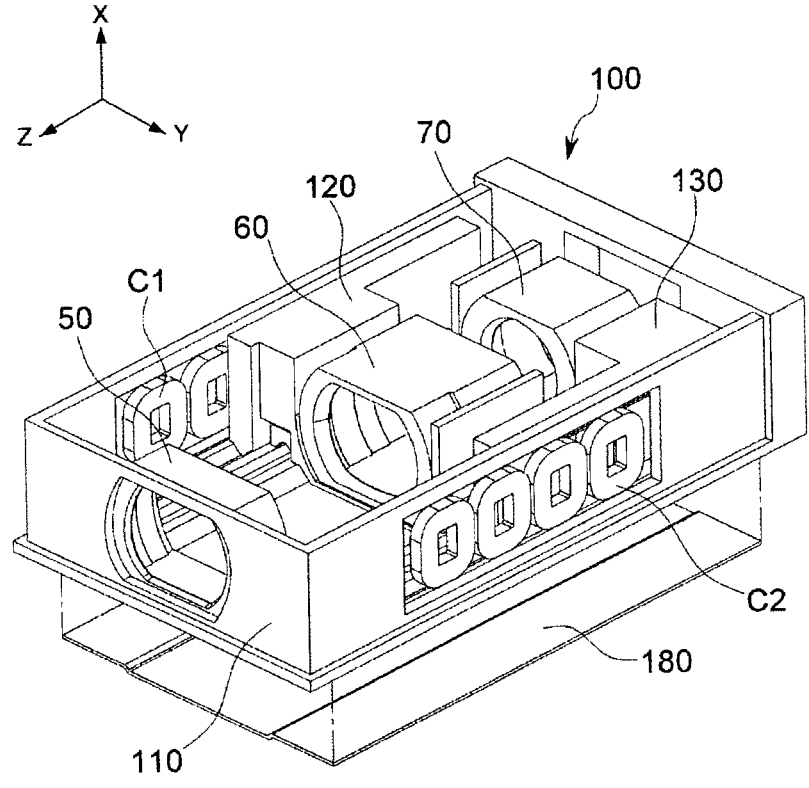
FIG. 2 illustrates the overall configuration of a zoom drive actuator in accordance with a preferred embodiment of the present invention.
Figure 3:
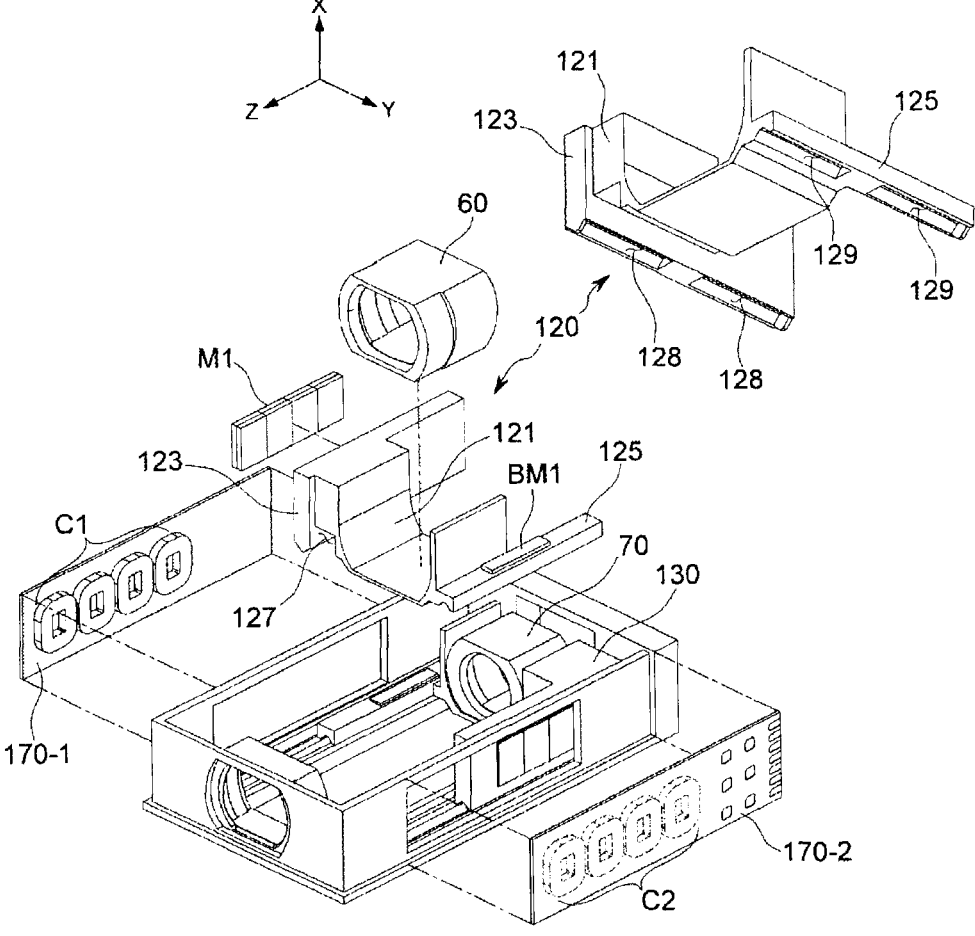
FIG. 3 illustrates the configuration in detail of the first carrier and the like according to an embodiment of the present invention.
Figure 4:
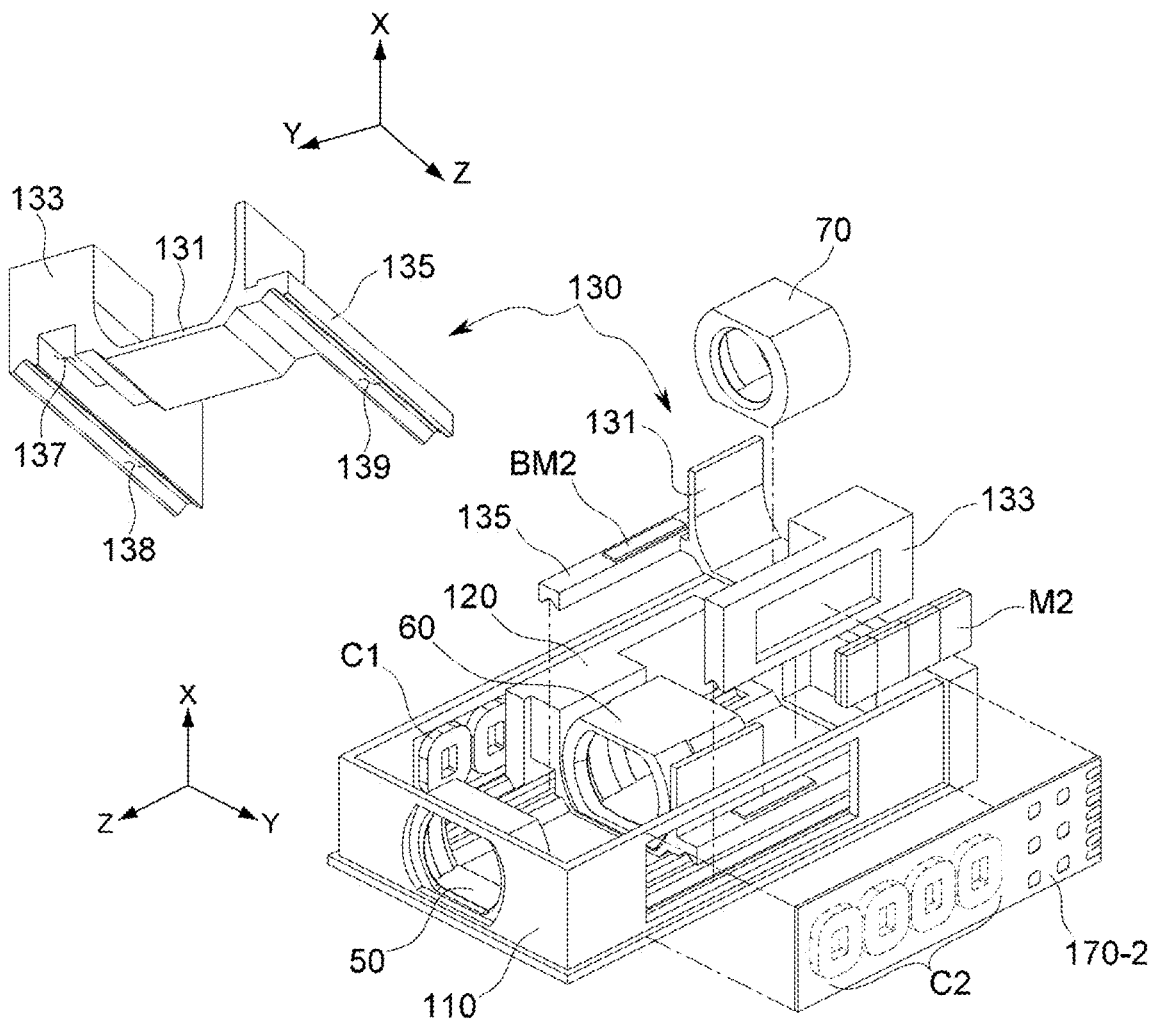
FIG. 4 illustrates the configuration in detail of the second carrier and the like according to an embodiment of the present invention.

FIG. 2 illustrates the overall configuration of an actuator (100) in accordance with a preferred embodiment of the present invention.

The actuator (100) of the present invention comprises a housing (110), which amounts to the base frame of the actuator (100) accommodating the inner parts, a casing (190) attached to the housing (110) and capable of functioning as a shield can, a first carrier (120) and a second carrier (130).

Each of the first carrier (120) with a first lens assembly (60) attached thereto and the second carrier (130) with a second lens assembly (70) attached thereto amounts to a moving body in linear motion along the optical axis (Z-axis), while correspondingly the housing (110) amounts to a fixed body.

In the embodiment illustrated in FIG. 2 and the like, the second lens assembly (70) is attached to the second carrier (130) so as to place the second lens assembly (70) anterior or posterior to the first lens assembly (60) along the optical axis while the second carrier (130) moves in linear motion along the optical axis.

As will be described below, the first carrier (120) is equipped with a first magnet (M1) and in the housing (110) is equipped a first coil unit (C1) that faces and imparts driving force to the first magnet (M1).

Once power of appropriate magnitude and direction is applied by the control of a first operating driver (not shown) to the first coil unit (C1), electromagnetic force is generated between the first coil unit (C1) and the first magnet (M1), and this force generated moves the first carrier (120) back and forth along the optical axis. The first coil unit (C1) and the like can be disposed on an open face of the housing (110) in the form of installation on a first circuit board (170-1).

Similarly, once a second operating driver (not shown) exerts control for application power of appropriate magnitude and direction to a second coil unit (C2), electromagnetic force generated between the second coil unit (C2) and a second magnet (M2) equipped to the second carrier (130) moves the second carrier (130) linearly along the optical axis. The second coil unit (C2) and the like can be disposed on an open face of the housing (110) in the form of installation on a second circuit board (170-2).

Although the accompanying figures illustrate a first carrier (120) to which a first lens assembly (60) is attached and a second carrier (130) to which a second lens assembly (70) is attached, this is only one of the possible examples. Needless to say, further numbers of lens assemblies and carriers can be comprised depending on the particular embodiment.

Hereinafter, for the purposes of efficient description, the number of carriers illustrated as being comprised in an actuator (100) will be two in the examples, and in addition, the carrier placed anterior (upstream) along the optical axis shown in FIG. 2 will be designated as the first carrier (120), while the carrier placed posteriorly (downstream) as the second carrier (130).

Thus, as each of the first carrier (120) and the second carrier (130) moves linearly along the optical axis, so does each lens (lens assembly) attached to each carrier along the optical axis, and through the positional relationship between these lenses, zooming or auto-focusing is implemented.

As explained above, a fixed lens assembly (50) can be set up anterior to the first lens assembly (60) in certain embodiments to suit the optical performance or specification of the actuator (100).

Furthermore, balls (B1-B4, see FIG. 7) are preferably placed between the first carrier (120) and the housing (110) as well as between the second carrier (130) and the housing (110) in order to set the first (120) and the second (130) carriers in smooth linear motion with the least friction.

A yoke (180) made of metallic material is equipped on the lower face (YZ plane) of the housing (110) to induce attractive force toward the first (M1) and/or second (M2) magnets, thereby guiding tight contact of the first (120) and second (130) carriers against the housing (110) through the interposed balls (B1-B4).

FIGS. 3 to 6 illustrate a configuration in detail for a first carrier (120), a second carrier (130) and a housing (110) in accordance with an embodiment of the present invention and the relationship among these components.

As described above, the first carrier (120) of the present invention to which the first lens assembly (60) is attached is a moving body in linear motion along the optical axis. More particularly, the first carrier (120) comprises a first mount (121) equipped with the first lens assembly (60), a first guide (125) and a first support (123) carrying the first magnet (M1).

The first mount (121) as illustrated in the figures is shaped to match that of the first lens assembly (60) so that it can be equipped with the lens assembly (60). In certain embodiments, a casing or a stopper (not shown) can be provided to the upper part of the first mount (121) to prevent the first lens assembly (60) from being dislocated, e.g., along the X-axis.

Figure 5:
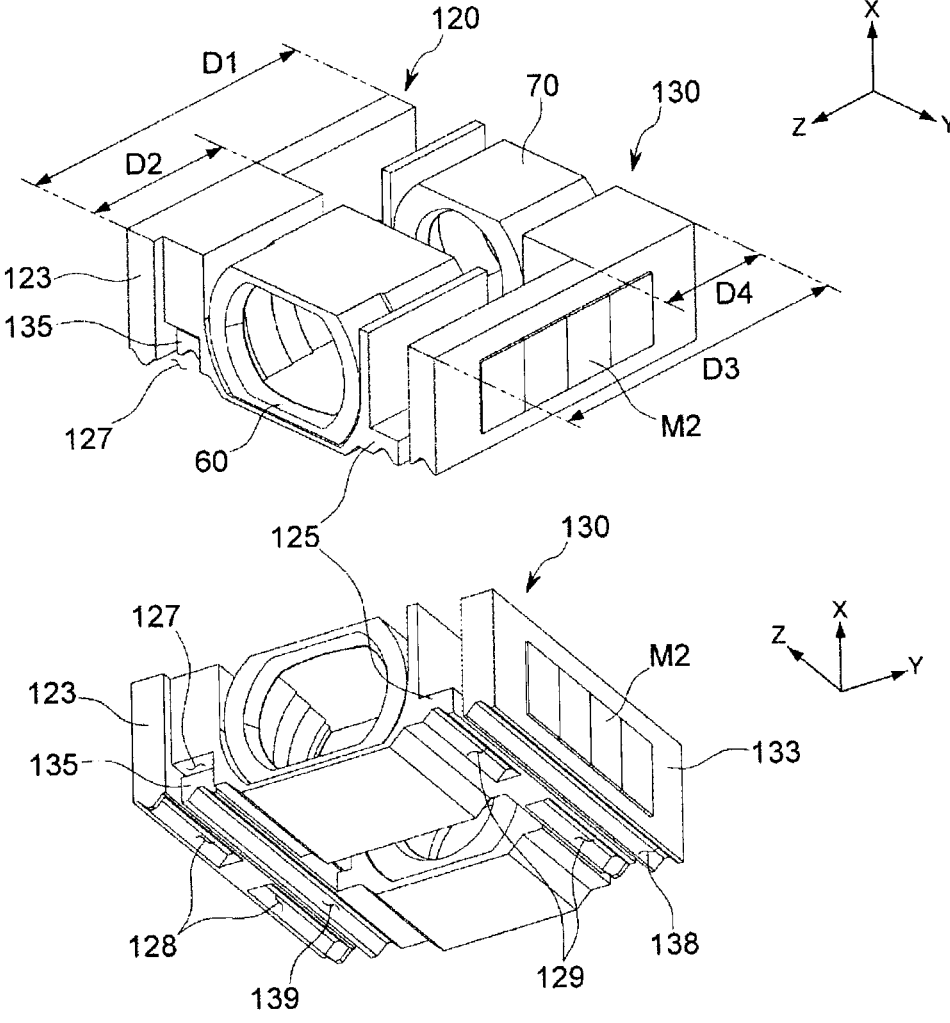
FIG. 5 and FIG. 6 depict the mutual relationship between the first and second carriers.
Figure 6:
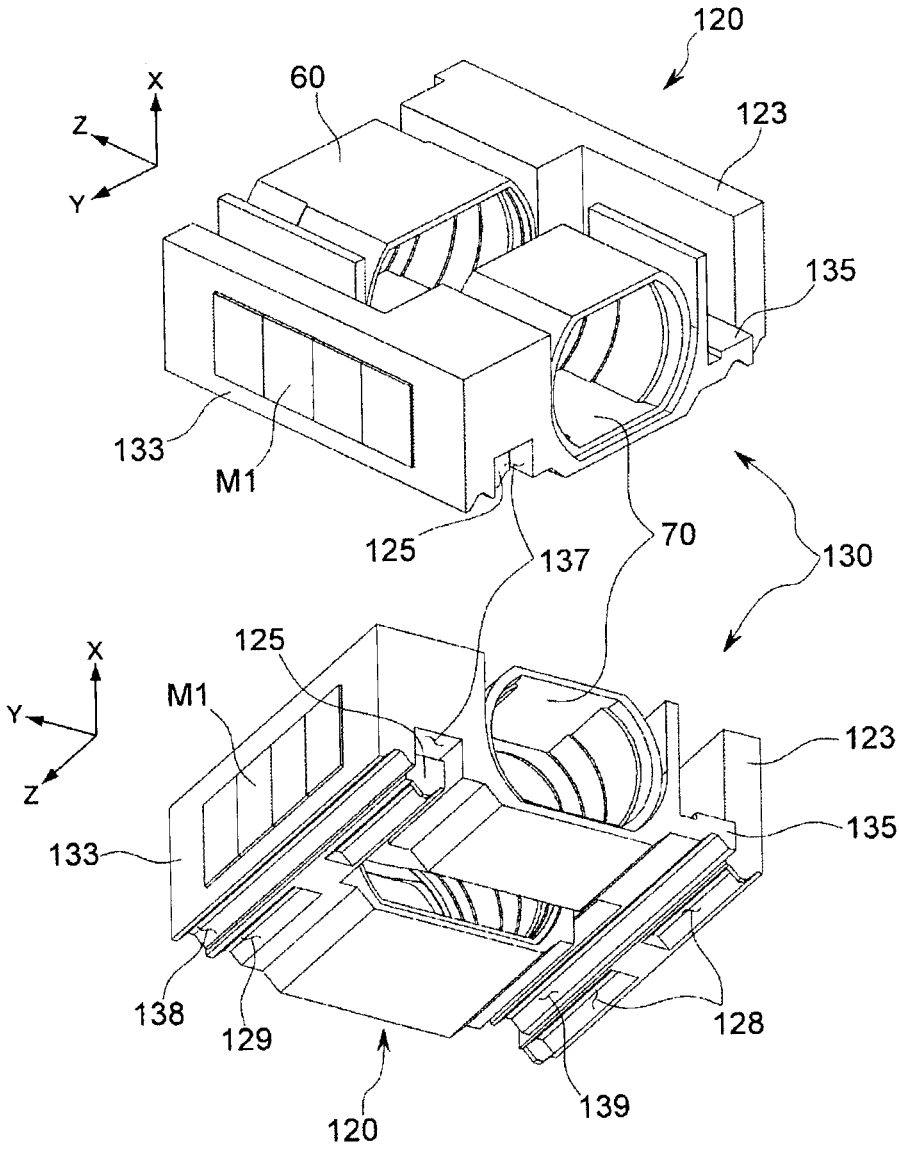

The first support (123) carrying the first magnet (M1) is fitted on the first mount (121) either to its left or right, and extends, as illustrated (D1, see FIG. 5), along the optical axis longer than the first mount (121) (D2, see FIG. 5).

The first support (123) may be made integral with the first mount (121), and for the purpose of forming a physical structure symmetric with the second support (133) of the second carrier (130) as will be described later, preferably has a shape extending along one of the optical axes (Z-axis).

Since the first support (123) of the present invention as described has a shape extended along the optical axis, it is capable of carrying a first magnet (M1) matching in size to the extended range to further intensify the driving force of the first carrier (120).

Moreover, a first rail (128) that faces a first guide rail (111) formed on the housing (110) can be formed on the first support (123), in which case a first ball (B1) is placed so that part of it is accommodated in the space between the first guide rail (111) and the first rail (128).

The first guide (125) is fitted on a side of the first mount (121), either to its left or right, that is opposite the side on which the first support (123) is fitted. As illustrated in the drawings, the first guide (125) has a height (based on the X-axis) shorter than that of the first support (123) and has a bar shape extending along the optical axis longer than the first mount (121).

A second rail (129) that faces a second guide rail (112) formed on the housing (110) can be formed on the first guide (125), in which case a second ball (B2) is placed so that part of it is accommodated in the space between the second guide rail (112) and the second rail (129).

Accordingly, the first carrier (120) can provide more stable physical support to the motion of the first lens assembly (60) along the optical axis through the first support (123) and the first guide (125), wherein the first support (123) and the first guide (125) are respectively placed to the left and right of the first mount (121) and are shaped to extended longer along the optical axis than the first mount (121).

The first guide (125) of the first carrier (120) is equipped with a first balancing magnet (BM1) that generates attractive force towards the yoke (180). As explained earlier, the first magnet (M1) attached to the first support (123) of the first carrier (120) generates attractive force toward the yoke (180) equipped to the housing (110).

As such, the physical guiding through the balls (B1, B2) can be provided in a more stable fashion since the first carrier (120) of the present invention tightly presses towards the housing (110) while maintaining the overall equilibrium by means of attractive forces between the first magnet (M1) and the yoke (80) as well as between the first balancing magnet (BM1) and the yoke (180).

The first coil unit (C1) mounted to the housing (110), preferably consists of n coils (n being a natural number of two or more) placed anterior or posterior along the optical axis to augment the driving force.

The second carrier (130) has a physical structure commensurate with the first carrier (120) described above, and is formed symmetrically in the opposite direction with respect to the first carrier (120) as shown in the drawings.

More particularly, the second carrier (130) comprises a second mount (131) equipped with a second lens assembly (70), a second guide (135) and a second support (133) carrying the second magnet (M2).

The second support (133) of the second carrier (130) is fitted on a side of the second mount (131), either to its left or right, that is opposite the side on which the first support (123) of the first carrier (120) is fitted. Furthermore, the second support (133) extends (D3, see FIG. 5) along the optical axis further than the length of the second mount (131) (D4, see FIG. 5), but in a direction opposite to that of the first support (123) of the first carrier (120).

Thus, sufficient room for moving the first (60) and second (70) lens assemblies can be secured by keeping the overall physical structures of the first (120) and the second (130) carriers similar while positioning the first mount (121) equipped with the first lens assembly (60) and the second mount (131) equipped with the second lens assembly (70) at the respective middle parts of these carriers.

Simultaneously, the first (M1) and second magnets (M2) for driving respectively, the first (120) and second carriers (130) can be installed in larger sizes by means of the first (123) and second (133) supports with the view to effectively enhancing the driving force.

Furthermore, the first (M1) and second (M2) magnets are placed apart from each other, respectively to the left and right (based on the Y-axis). In correspondence, the first (C1) and second coil units (C2), each facing respectively, the first (M1) and second (M2) magnets, are accordingly placed apart from each other.

As explained above, the first magnet (M1) and the first coil unit (C1) are set apart from the second magnet (M2) and the second coil unit (C2), which enables interference and influence on the electromagnetic force for driving each carrier to be minimized; leading to more precise implementation of independent driving of the first (120) and second carriers (130).

A third rail (138) that faces a third guide rail (113) formed on the housing (110) can be formed on the second support (133), in which case a third ball (B3) is placed so that part of it is accommodated in the space between the third guide rail (113) and the third rail (138).

The second guide (135) is fitted on a side of the second mount (131), either to its left or right, that is opposite the side on which the second support (133) is fitted. As illustrated in the drawings, the second guide (135) has a height (based on the X-axis) shorter than that of the second support (133) and has a bar shape extending along the optical axis longer than the second mount (131).

A fourth rail (139) that faces a fourth guide rail (114) formed on the housing (110) can be formed on the second guide (135), in which case a fourth ball (B4) is placed so that part of it is accommodated in the space between the fourth guide rail (114) and the fourth rail (139).

By means of the second support (133) and the second guide (135), respectively placed to the left and right of the second mount (131) and extending further along the optical axis than the second mount (131) as explained above, the second carrier (130) is able to provide more stable physical support to the motion of the second lens assembly (70) along the optical axis.

The second guide (135) of the second carrier (130) is equipped with a second balancing magnet (BM2) that generates attractive force towards the yoke (180). The second magnet (M2) attached to the second support (133) of the second carrier (130) generates attractive force toward the yoke (180) equipped to the housing (110).

As such, the second carrier (130) of the present invention presses itself towards the housing (110) while maintaining the overall equilibrium through the attractive forces between the second magnet (M2) and the yoke (80) as well as between the second balancing magnet (BM2) and the yoke (180). Consequently, physical guiding through the balls (B3, B4) can be provided in a more stable fashion.

As illustrated in FIGS. 3-6, the first carrier (120) comprises a first space (127) which has a corridor extending along the optical axis and allowing the second guide (135) of the second carrier (130) to make a passage through it.

Correspondingly, the second carrier (130) comprises a second space (137) which has a corridor extending along the optical axis and allowing the first guide (125) of the first carrier (120) to make a passage through it.

Such physical structure formed by the first space (127) of the first carrier (120) and the second space (137) of the second carrier (130) allows the first guide (125) of the first carrier (120) to enter into the second space (137) of the second carrier (130) and the second guide (135) of the second carrier (130) to enter into the first space (127) of the first carrier (120).

Therefore, the first (120) and second (130) carriers of the present invention not only are capable of independent movements, but also contribute to a better utilization of space through their physical arrangement in which a part of one carrier has been made to cross over or overlap upon another from the other carrier.

Figure 7:
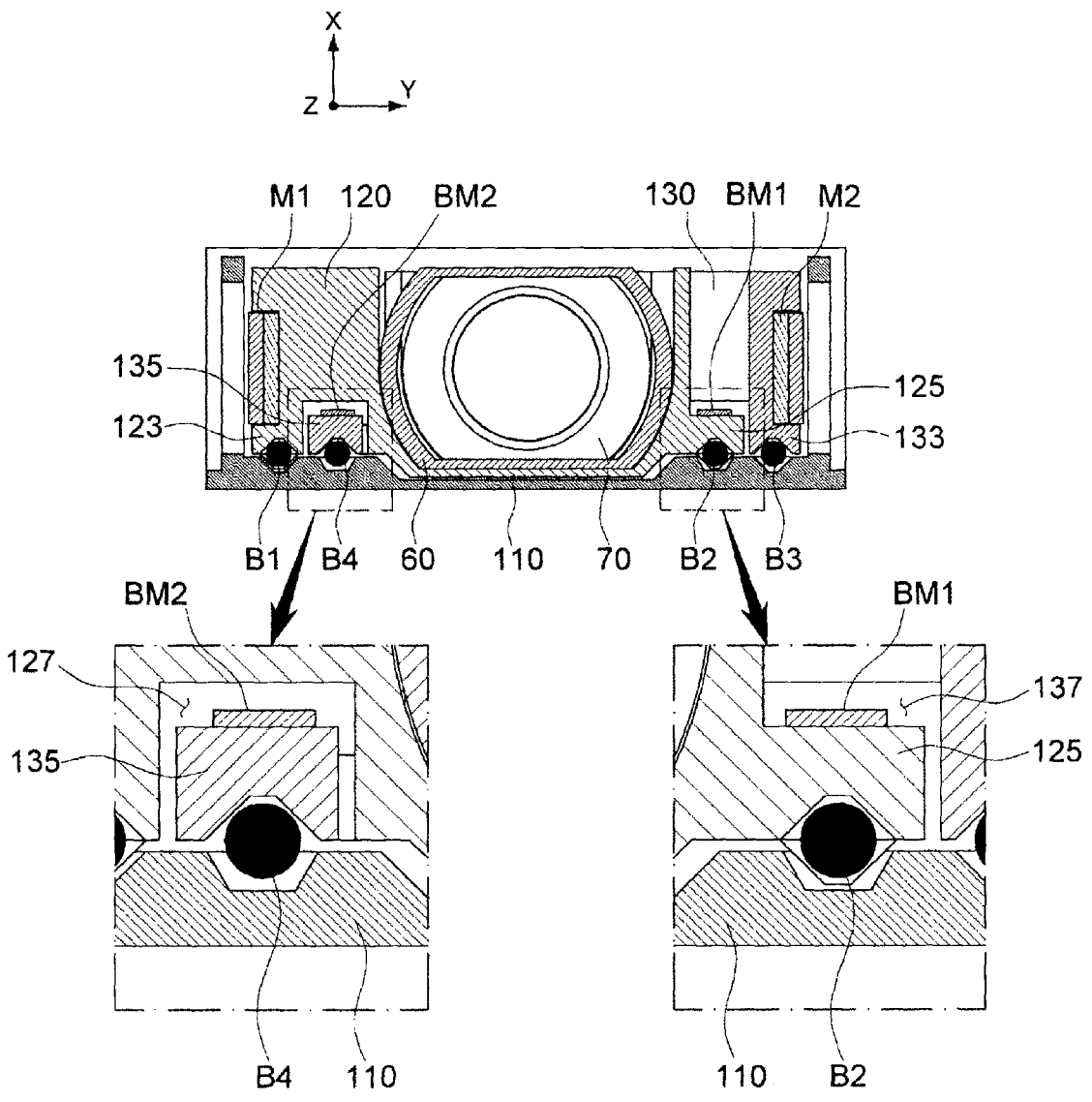
FIG. 7 is a cross-sectional view depicting the configuration in detail of the present invention.
Figure 8:
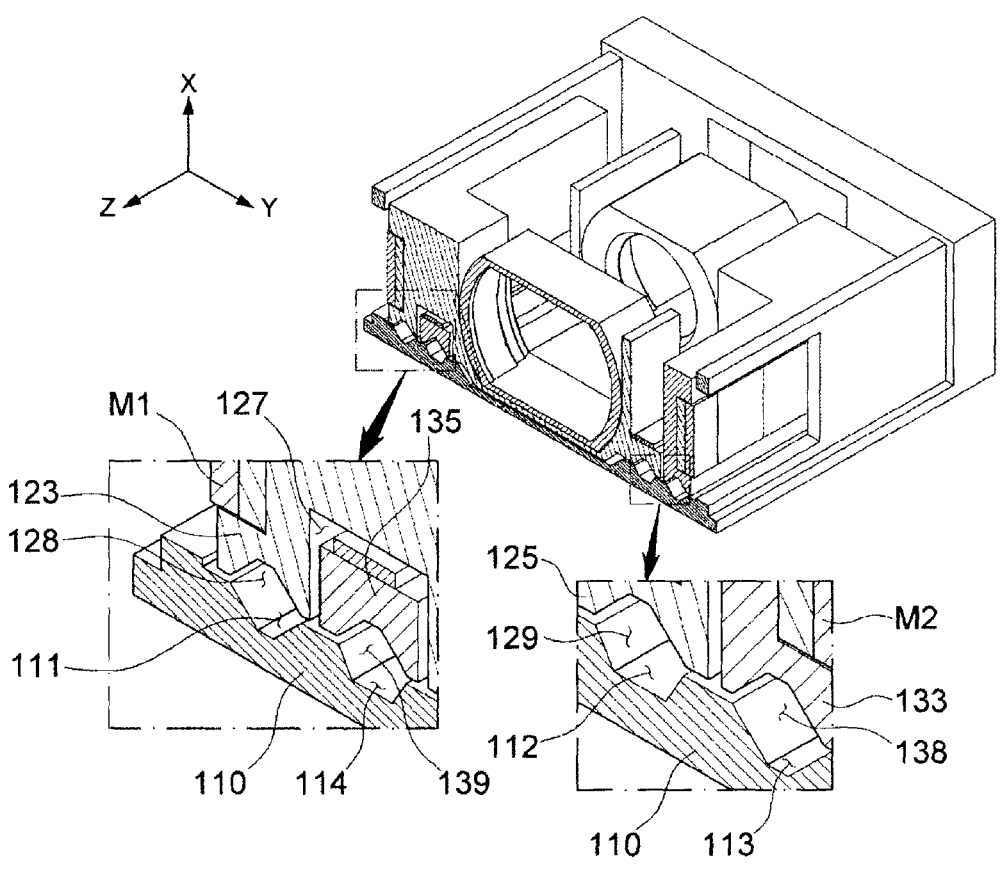
FIG. 8 illustrates the configuration of the rails and guide rails according to an embodiment of the present invention.

FIG. 7 is a cross-sectional view illustrating in detail an embodiment of the present invention. FIG. 8 illustrates the configuration of the rails (128, 129, 138, 139) and the guide rails (111, 112, 113, 114) for an embodiment of the present invention.

As illustrated in FIG. 7, the second guide (135) of the second carrier (130) is located in the first space (127) of the first carrier (120) and moves linearly along the optical axis with physical guidance from the fourth ball (B4) as the second carrier (130) moves.

Correspondingly, the first guide (125) of the first carrier (120) is located in the second space (137) of the second carrier (130) and moves linearly along the optical axis via the second space (137) with physical guidance from the second ball (B2) as the first carrier (120) moves.

The physical arrangement as such of the first (120) and second (130) carriers where a part of one carrier has been made to cross over or overlap upon another from the other carrier guarantees independent movement for each carrier and at the same time allows overall reduction in size, leading to further improvements in space utilization.

For optimal space design, the first space (127) is preferably formed between the first mount (121) and the first support (123), the second space (137) preferably between the second mount (131) and the second support (133).

As illustrated in FIG. 8, on the bottom face (based on the X-axis) of the housing (110) are formed the first to fourth guide rails (111, 112, 113, 114).

The first guide rail (111) and the second guide rail (112) are configured to guide the balls (B1, B2) interposed between the first carrier (120) and the housing (110). The first guide rail (111) faces the first rail (128) while the second guide rail (112) faces the second rail (129).

A third guide rail (113) is an element facing the third rail (138) formed on the second support (133) of the second support (130). A fourth guide rail (114) is an element facing the fourth rail (139) formed on the second guide (135) of the second carrier (130).

A third ball (B3) is interposed between the third rail (138) and the third guide rail (113) and a fourth ball (B4) is interposed between the fourth rail (139) and the fourth guide rail (114).

As described earlier, both the first (120) and second carriers (130) of the present invention are compartmentalized so as to have one region for attaching the lens and another for attaching the magnet, with the magnet-attachment regions having an extended shape along the optical axis. The first (120) and second carriers (130) themselves are physically configured symmetrically but in opposing directions.

The present invention, as contemplated above, affords the guide rails an extensive reach along the optical axis, which in turn leads to more effective expansion in the stroke ranges along the optical axis for the first (120) and second (130) carriers free of interference or physical disturbance.

To implement an effective guiding towards linearity in path, it is preferred that at least one or more of the rails (128, 129, 138, 139) and/or guide rails (111, 112, 113, 114) accommodate some of the balls (B1, B2, B3, B4).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" etc. are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. A zoom drive actuator, said zoom drive actuator comprising:
 a first carrier movable along an optical axis;
 a second carrier capable of moving anterior or posterior to the first carrier along the optical axis;
 a housing enclosing the first and second carriers;
 a first coil unit; and
 a second coil unit;
 wherein the first carrier comprises a first mount equipped with a first lens assembly, a first support placed on a side of the first mount and having a first magnet attached thereto, and a first guide placed on the side of the first mount opposite to the first support, said the first guide extending further along the optical axis than the first mount;
 wherein the second carrier comprises a second mount equipped with a second lens assembly, a second support placed on a side of the second mount and having a second magnet attached thereto, and a second guide placed on the side of the second mount opposite to the second support, said the second guide extending further along the optical axis than the second mount;
 wherein the first coil unit faces the first magnet and the second coil unit faces the second magnet and the first guide and the second guide have a shape of a bar extending in the direction of the optical axis; and
 wherein the first carrier comprises a first hole forming a corridor into which the second guide is inserted and the second carrier comprises a second hole forming a corridor into which the first guide is inserted.

2. The zoom actuator according to claim 1, wherein the first space is formed between the first mount and the first support.

3. The zoom actuator according to claim 1, wherein the second space is formed between the second mount and the second support.

4. The zoom actuator according to claim 1, wherein the zoom actuator further comprises:
 a yoke equipped to the housing, said yoke generating an attractive force towards the first magnet; and
 a first balancing magnet attached to the first guide, said first balancing magnet generating an attractive force towards the yoke.

5. The zoom actuator according to claim 1, wherein the zoom actuator further comprises:
 a yoke equipped to the housing, said yoke generating an attractive force towards the second magnet; and
 a second balancing magnet attached to the second guide, said second balancing magnet generating an attractive force towards the yoke.

6. The zoom drive actuator according to claim 1,
 wherein the first support comprises a first rail facing a first guide rail formed on the housing, said first rail extending further along the optical axis than the first mount;
 wherein the first guide comprises a second rail facing a second guide rail formed on the housing, and
 wherein the zoom drive actuator further comprises a plurality of balls; with at least one of said plurality of balls positioned between the first rail and the first guide rail and at least one of said plurality of balls positioned between the second rail and the second guide rail.

7. The zoom actuator according to claim 6,
 wherein the second support comprises a third rail facing a third guide rail formed on the housing, said third rail extending further than the second mount in a direction opposite to the first support along the optical axis;
 wherein the second guide comprises a fourth rail facing a fourth guide rail formed on the housing, and
 wherein the zoom drive actuator further comprises a plurality of balls; with at least one of said plurality of balls positioned between the third rail and the third guide rail and at least one of said plurality of balls positioned between the fourth rail and the fourth guide rail.

* * * * *